United States Patent [19]

Bonis

[11] 4,430,288
[45] Feb. 7, 1984

[54] MAKING COEXTRUDED SHEETS AND CONTAINERS

[75] Inventor: Laszlo J. Bonis, Swampscott, Mass.

[73] Assignee: Composite Container Corporation, Medford, Mass.

[21] Appl. No.: 331,911

[22] Filed: Dec. 18, 1981

[51] Int. Cl.³ .............................................. B29C 17/02
[52] U.S. Cl. .................................... 264/510; 264/171; 264/322; 425/131.1; 425/133.5; 428/35
[58] Field of Search ............... 264/171, 173, 510–515, 264/322; 428/35; 425/133.5, 131.1

[56] References Cited

U.S. PATENT DOCUMENTS

| | | | |
|---|---|---|---|
| 3,223,761 | 12/1965 | Raley | 264/171 |
| 3,279,940 | 10/1966 | Francis | 117/94 |
| 3,457,337 | 7/1969 | Turner | 264/173 |
| 3,524,795 | 8/1970 | Peterson | 264/171 |
| 3,802,985 | 4/1974 | Leatherman | 264/171 |
| 3,833,704 | 9/1974 | Nissel | 264/171 |
| 3,918,865 | 11/1975 | Nissel | 264/171 |
| 3,925,591 | 12/1975 | Breitenfellner et al. | 264/171 |
| 3,959,431 | 5/1976 | Nissel | 425/133.5 |
| 3,977,153 | 8/1976 | Schrenk | 264/515 |
| 3,980,744 | 9/1976 | Cogswell | 264/173 |
| 3,993,810 | 11/1976 | Bonis | 264/171 |
| 4,152,387 | 5/1979 | Cloeren | 425/133.5 |
| 4,183,435 | 1/1980 | Thompson et al. | 206/557 |
| 4,188,443 | 2/1980 | Mueller et al. | 428/216 |
| 4,261,473 | 4/1981 | Yamada et al. | 264/512 |
| 4,292,355 | 9/1981 | Bonis | 425/35 |

FOREIGN PATENT DOCUMENTS

| | | | |
|---|---|---|---|
| 2504322 | 8/1975 | Fed. Rep. of Germany | 264/173 |
| 53-108162 | 9/1978 | Japan | 264/514 |
| 55-21279 | 2/1980 | Japan | 264/171 |
| 818176 | 8/1959 | United Kingdom | 264/171 |
| 1186211 | 4/1970 | United Kingdom | 264/171 |

*Primary Examiner*—Jeffery R. Thurlow

[57] ABSTRACT

A multilayered thermoplastic sheet suitable for thermoforming into containers, the sheet being simply and expeditiously prepared and provided with consistent and reliable bonds between layers in a single process step by coextruding a layer of a polyolefin having moisture barrier properties and a specific gravity greater than 0.9 with a polyester layer, to provide chemical resistance, microwave heatability, and quick and inexpensive thermoforming for the multilayered sheet.

6 Claims, 3 Drawing Figures

MAKING COEXTRUDED SHEETS AND CONTAINERS

FIELD OF THE INVENTION

The invention relates to coextruded sheets and containers made from them.

BACKGROUND OF THE INVENTION

Polyolefins with moisture barrier properties such as polypropylene and polyethylene have been used to form containers; however, thermoforming of polyolefins is very slow, and therefore expensive, and it is difficult to achieve a glossy appearance after thermoforming polyolefins. Polyester, on the other hand, has no barrier properties, can be easily thermoformed, and can be heated by microwaves, and polyester surfaces can have gloss after thermoforming.

SUMMARY OF THE INVENTION

It has been discovered that by coextruding polyester with a polyolefin having moisture barrier properties, a useful multilayered sheet results. In addition to a moisture barrier, the sheet can have a glossy surface, chemical resistance, and microwave heatability, and can be easily thermoformed. By coextrusion of the materials, a multilayered sheet with high quality bonds between the layers in terms of consistency and reliability is simply and expeditiously provided in a single process step without having to laminate a plurality of different layers together.

In preferred embodiments, the polyester layer and the polyolefin layer are bonded to each other by an adhesive tie layer; and additional adhesive tie and polyester layers are on the other side of the polyolefin layer to result in a five-layer structure that has resistance to curling owing to the symmetrical structure, and has a glossy appearance on both of the outer surfaces. In some preferred embodiments the polyolefin and polyester are transparent and clear; in other preferred embodiments at least one one of the layers is colored.

DESCRIPTION OF THE PREFERRED EMBODIMENT

The structure and manufacture of the presently preferred embodiment of the invention will now be described after first briefly describing the drawings.

DRAWINGS

STRUCTURE

Turning to the figures, there is shown container 10 in which food (e.g., a ready-prepared stew) has been packed. The container consists of bowl 14 and lid 16.

Figure 3:
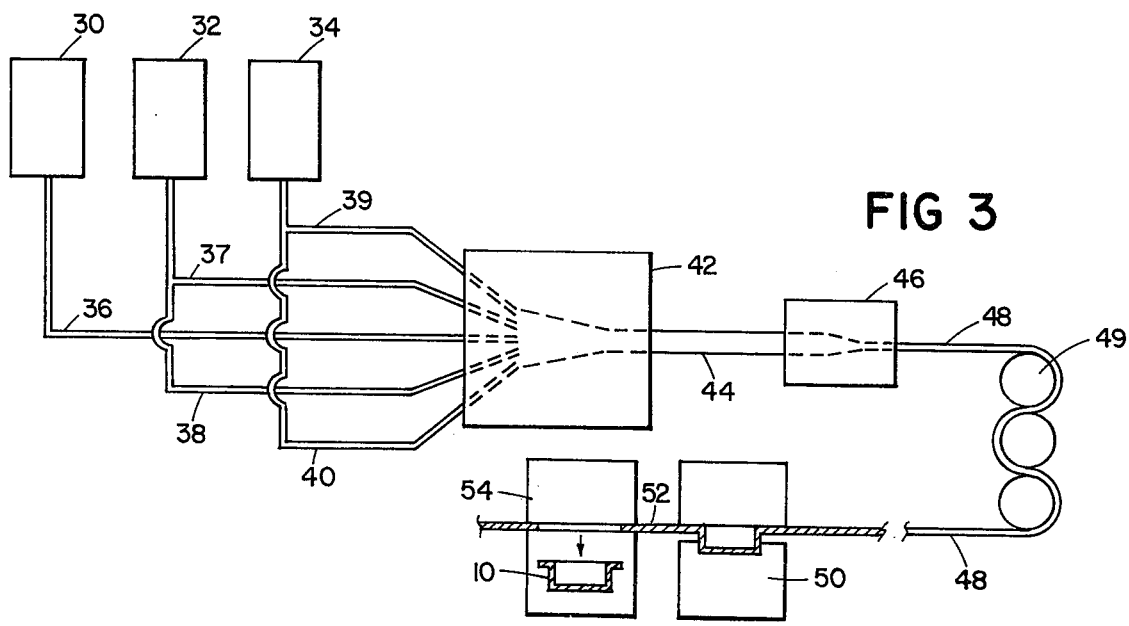
FIG. 3 is a diagrammatical view of the manufacturing process for forming the FIG. 1 container.

Both the lid and bowl are made from multilayered sheets that are formed by coextrusion. Bowl 14 is thermoformed from such a sheet, as depicted in FIG. 3. Lid 16 is cut from a similar sheet and sealed to rim 20 of the bowl.

Figure 2:
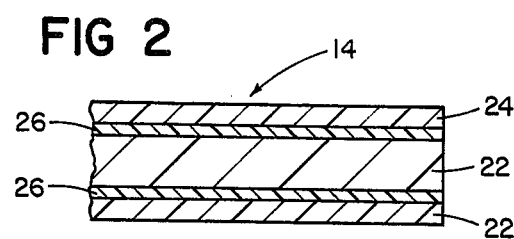
FIG. 2 is a cross-sectional view, taken at 2—2 of FIG. 1, showing the multilayered structure of the container.

As shown in FIG. 2, the finished bowl and lid have five layers.

Referring to FIG. 2 there is shown a portion of the wall of bowl 14. It has central layer 22 made of crystalline polypropylene (available from Rexene Company, Paramus, N.J. and having an $H_2O$ permeability at 100° F., 90% humidity of less than about 1.0 gm/mil/100 $in^2$-24 hr, a specific gravity greater than 0.9, and a melt flow index of 4 decigrams/min), outer layers 24 of polyester (available from Eastman Kodak Company under the trade designation Kodar), and two intermediate tie layers 26 made of suitable adhesive (ethylene vinyl acetate containing adhesive material available from DuPont under the trade designation CXA 1123). In thermoformed container 10, polypropylene layer 22 is 10 mils thick, outer polyester layers 24 are each 3 mils thick, and intermediate adhesive tie layers 26 are each ½ mil thick, resulting in a 17 mil thick wall.

Container 10 is transparent and has a moisture barrier provided by polypropylene layer 22 and, glossy surfaces, chemical resistance, and microwave heatability provided by outer polyester layers 24. The symmetrical nature of the five-layer wall structure provides resistance to curling.

Manufacture

Referring to FIG. 3, the coextrusion process for forming the five-layer sheet for container 10 is shown. Three heated containers 30, 32, and 34, serve as sources of polypropylene, adhesive tie layer, and polyester, respectively. Five conduits 36, 37, 38, 39, 40, supply the heated materials to coextrusion block 42. There the materials merge together to form under pressure a unitary, five-layer thick stream 44 of generally circular cross-section. The middle layer is made of the polypropylene, the outer layers are made of polyester, and the intermediate layers are made of the adhesive tie layer material. Stream 44 passes into extrusion die 46 (e.g., Welex standard 54" flex-lip) and is extruded into continuous sheet 48, about 34 mils thick. Sheet 48 then passes through a series of chill rolls 49. The sheet may then be processed into containers, or wound into spools (not shown) for storage.

To process sheet 48 into containers, the sheet is passed through conventional thermoforming apparatus 50 (the vacuum forming type well-known in the art), which impresses the container shape and in so doing reduces the wall thickness by about 50% on the average, making the finished container wall about 17 mils thick. The thicknesses of individual layers are also reduced by about 50% during thermoforming. It has been found that thermoforming of sheet 48 proceeds easily and faster than the slow, and therefore expensive, thermoforming of polypropylene alone.

Figure 1:
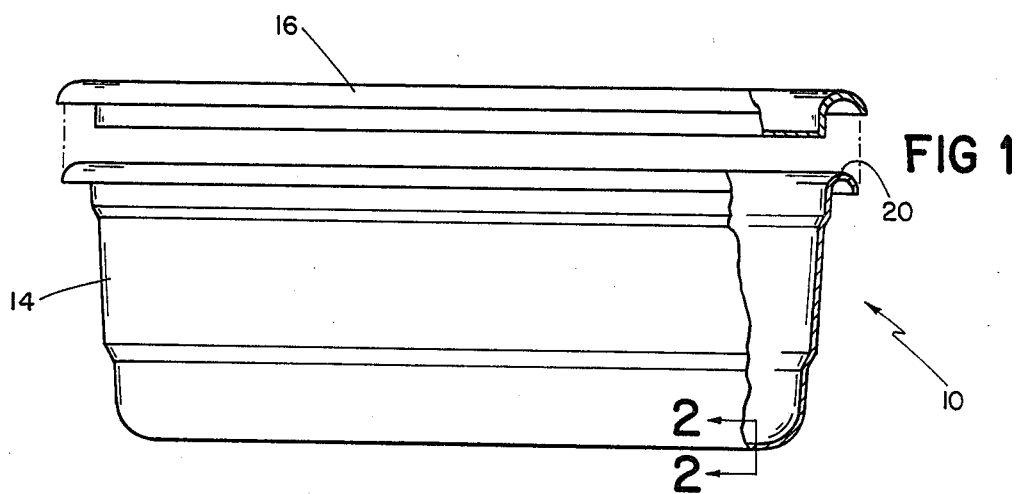
FIG. 1 is an elevation, partially broken away, of a container according to the invention.

After thermoforming, the shaped sheet 52 passes through trim press 54, in which the individual bowls 14 for the containers are separated. Thereafter, each bowl is given curled rim 20 (FIG. 1) by a conventional curling machine (not shown).

Lids 16 are separately cut from sheet 48.

By this method of manufacture, a complex multilayered sheet is simply and expeditiously prepared from three sources of material by a single coextrusion process, and there is no need for laminating a large number of different layers or multilayered sheets together.

Other Embodiments

Other embodiments of the invention are within the scope of the appended claims. The word "polyester" as used in the claims includes polyethylene terephthalate and also includes copolyesters such as glycol modified polyethylene terephthalate. Other polyolefins with moisture barrier properties such as crystalline polyethylene can be used in place of polypropylene. Also, one of the layers could have color concentrate added to it to provide a transparent tint or an opaque color to the structure.

What is claimed is:

1. A method of making a multilayered structure, said method comprising
    coextruding by
        separately heating a polyolefin having moisture barrier properties and a specific gravity greater than 0.9 and polyester,
        supplying said heated polyolefin and polyester to a coextrusion block to form a multilayer stream with
            a layer of said polyolefin having moisture barrier properties and a specific gravity greater than 0.9, and
            a layer of said polyester, and
        flattening said multilayer stream in a coextrusion die to produce a multilayer sheet having a width greater than the width of said multilayer stream, a thickness less than the height of said multilayer stream, a polyester layer and a polyolefin layer,
        said polyester layer providing chemical resistance, mircowave heatability and thermoformability during manufacture,
        said sheet having consistent and reliable bonds between layers owing to its having been coextruded.

2. The method of claim 1 wherein said coextruding includes coextruding an adhesive tie layer between said polyester and polyolefin layers.

3. The method of claim 1 or 2 wherein said polyolefin is polypropylene.

4. The method of claim 2 wherein said coextruding includes coextruding an adhesive tie layer and a polyester layer on the other side of said polyolefin layer to result in a five-layer structure that has resistance to curling owing to the symmetrical structure.

5. The method of claims 1, 2 or 4 further comprising thermoforming said sheet into the desired shape of a container.

6. The method of claim 1 wherein said multilayer stream has a generally circular cross section.

* * * * *